US010606333B2

(12) United States Patent
Sasson et al.

(10) Patent No.: US 10,606,333 B2
(45) Date of Patent: Mar. 31, 2020

(54) WAKE-UP DETECTOR

(71) Applicant: QUALCOMM Incorporated, San Diego, CA (US)

(72) Inventors: Oron Sasson, Haifa (IL); Alon Yehezkely, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 15/908,448

(22) Filed: Feb. 28, 2018

(65) Prior Publication Data
US 2018/0188791 A1 Jul. 5, 2018

Related U.S. Application Data

(62) Division of application No. 15/139,756, filed on Apr. 27, 2016, now Pat. No. 9,946,322.
(Continued)

(51) Int. Cl.
*G06F 1/32* (2019.01)
*G06F 1/3209* (2019.01)
(Continued)

(52) U.S. Cl.
CPC .......... *G06F 1/3209* (2013.01); *G06F 1/3243* (2013.01); *H04B 1/40* (2013.01);
(Continued)

(58) Field of Classification Search
CPC ....... G06F 1/3209; G06F 1/3243; H04B 1/40; H04W 52/0225; Y02D 70/02
(Continued)

(56) References Cited

U.S. PATENT DOCUMENTS

| 5,521,445 A * | 5/1996 | Letorey .............. G04C 15/0054 307/139 |
| 7,774,204 B2 | 8/2010 | Mozer et al. |

(Continued)

FOREIGN PATENT DOCUMENTS

| JP | H09162931 A | 6/1997 |
| JP | 2009159148 A | 7/2009 |
| JP | 2012105007 A | 5/2012 |

OTHER PUBLICATIONS

International Search Report and Written Opinion—PCT/US2016/065835—ISA/EPO—dated May 15, 2017.
(Continued)

*Primary Examiner* — Volvick Derose
(74) *Attorney, Agent, or Firm* — Arent Fox, LLP

(57) ABSTRACT

The apparatus is a wake-up circuit including a first comparator coupled to an input signal and configured to compare the input signal to a first comparison value. The wake-up circuit includes a second comparator coupled to the input signal and configured to compare the input signal to a second comparison value. The wake-up circuit further includes an exclusive OR gate. A first input of the exclusive OR gate is coupled to an output of the first comparator. A second input of the exclusive OR gate is coupled to an output of the second comparator. The wake-up circuit also includes a tunable charge pump coupled to an output of the exclusive OR gate and configured to convert a signal from the exclusive OR gate to a DC value to wake up a circuit being monitored.

24 Claims, 11 Drawing Sheets

Related U.S. Application Data

(60) Provisional application No. 62/290,880, filed on Feb. 3, 2016, provisional application No. 62/278,899, filed on Jan. 14, 2016.

(51) Int. Cl.
*H04B 1/40* (2015.01)
*H04W 52/02* (2009.01)
*G06F 1/3234* (2019.01)
*G06F 1/3203* (2019.01)

(52) U.S. Cl.
CPC ....... *H04W 52/0225* (2013.01); *G06F 1/3203* (2013.01); *Y02D 70/23* (2018.01)

(58) Field of Classification Search
USPC ......................................................... 713/320
See application file for complete search history.

(56) References Cited

U.S. PATENT DOCUMENTS

| | | | | |
|---|---|---|---|---|
| 8,040,151 B2* | 10/2011 | Speers | ............ | H03K 19/17784 326/33 |
| 8,274,313 B2* | 9/2012 | Liu | ....................... | G01R 23/15 327/39 |
| 8,983,402 B2 | 3/2015 | Wang et al. | | |
| 8,988,254 B2 | 3/2015 | Liao et al. | | |
| 2004/0038620 A1* | 2/2004 | Small | .................... | A63H 30/04 446/491 |
| 2008/0021972 A1* | 1/2008 | Huelskamp | .......... | A61B 5/0031 709/211 |
| 2010/0245054 A1* | 9/2010 | Kim | .................... | G06K 7/10336 340/10.4 |
| 2011/0158303 A1* | 6/2011 | Gauthier | ........... | H04W 52/0283 375/224 |
| 2012/0309325 A1* | 12/2012 | Carbone | .................. | H04B 1/40 455/73 |
| 2013/0095780 A1* | 4/2013 | Prazan | ................. | H04B 1/1615 455/234.1 |
| 2014/0091770 A1* | 4/2014 | Lee | .......................... | B60L 58/12 320/135 |
| 2015/0050897 A1* | 2/2015 | Wang | ................ | H04W 52/0229 455/73 |
| 2015/0087248 A1* | 3/2015 | Yehezkely | ........... | H04B 1/0007 455/84 |
| 2015/0303905 A1 | 10/2015 | Kidd et al. | | |
| 2016/0091959 A1* | 3/2016 | Barak | ................... | G06F 1/3209 713/320 |
| 2016/0306409 A1* | 10/2016 | Mori | ........................ | H04B 1/04 |
| 2017/0205869 A1 | 7/2017 | Yehezkely et al. | | |

OTHER PUBLICATIONS

Partial International Search Report and Written Opinion—PCT/US2016/065835—ISA/EPO—dated May. 23, 2017.
European Search Report—EP18214661—Search Authority—The Hague—dated Feb. 21, 2019.

* cited by examiner

WAKE-UP DETECTOR

CROSS-REFERENCE TO RELATED APPLICATION(S)

This application is a divisional of U.S. patent application Ser. No. 15/139,756, entitled "WAKE-UP DETECTOR" and filed on Apr. 27, 2016, which claims the benefit of U.S. Provisional Application Ser. No. 62/278,899, entitled "Wake-up Detector for Radio Module," and filed on Jan. 14, 2016, and U.S. Provisional Application Ser. No. 62/290,880, entitled "Wake-up Detector," and filed on Feb. 3, 2016, each of which is expressly incorporated by reference herein in its entirety.

BACKGROUND

Field

The present disclosure relates generally to communication systems, and more particularly, to circuitry for a radio module or other electronic module for waking up from a low power mode.

Background

In some cases, it may be advantageous to power down circuitry when that circuitry is not in use. Powering down circuitry when that circuitry is not in use may conserve battery power. In some examples, conserving battery power may lead to longer battery life. In other examples, conserving battery power may allow a device to use a smaller battery while still providing a required battery life.

While it may be advantageous to power down circuitry when not in use, monitoring circuitry needed to determine when to power up the powered down circuitry will generally continue to consume power. Accordingly, it may be advantageous to use monitoring circuitry that uses very little power to perform the monitoring function. By using low-power monitoring circuitry and by powering down circuitry that is not in use, battery power may be conserved.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As discussed above, in some cases, it may be advantageous to power down circuitry when that circuitry is not in use to conserve battery power. In some examples, conserving battery power may lead to longer battery life or may allow a device to use a smaller battery while still providing a required battery life. As discussed above, while it may be advantageous to power down circuitry when not in use, monitoring circuitry needed to determine when to power up the powered down circuitry will generally continue to consume power. Accordingly, it may be advantageous to use monitoring circuitry that uses very little power to perform the monitoring function.

In an aspect of the disclosure, a method and an apparatus are provided. The apparatus is a wake-up circuit including a first comparator coupled to an input signal and configured to compare the input signal to a first comparison value. The wake-up circuit includes a second comparator coupled to the input signal and configured to compare the input signal to a second comparison value. The wake-up circuit further includes an exclusive OR gate. A first input of the exclusive OR gate is coupled to an output of the first comparator. A second input of the exclusive OR gate is coupled to an output of the second comparator. The wake-up circuit also includes a tunable charge pump coupled to an output of the exclusive OR gate and configured to convert a signal from the exclusive OR gate to a direct current (DC) value to wake up a circuit being monitored.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
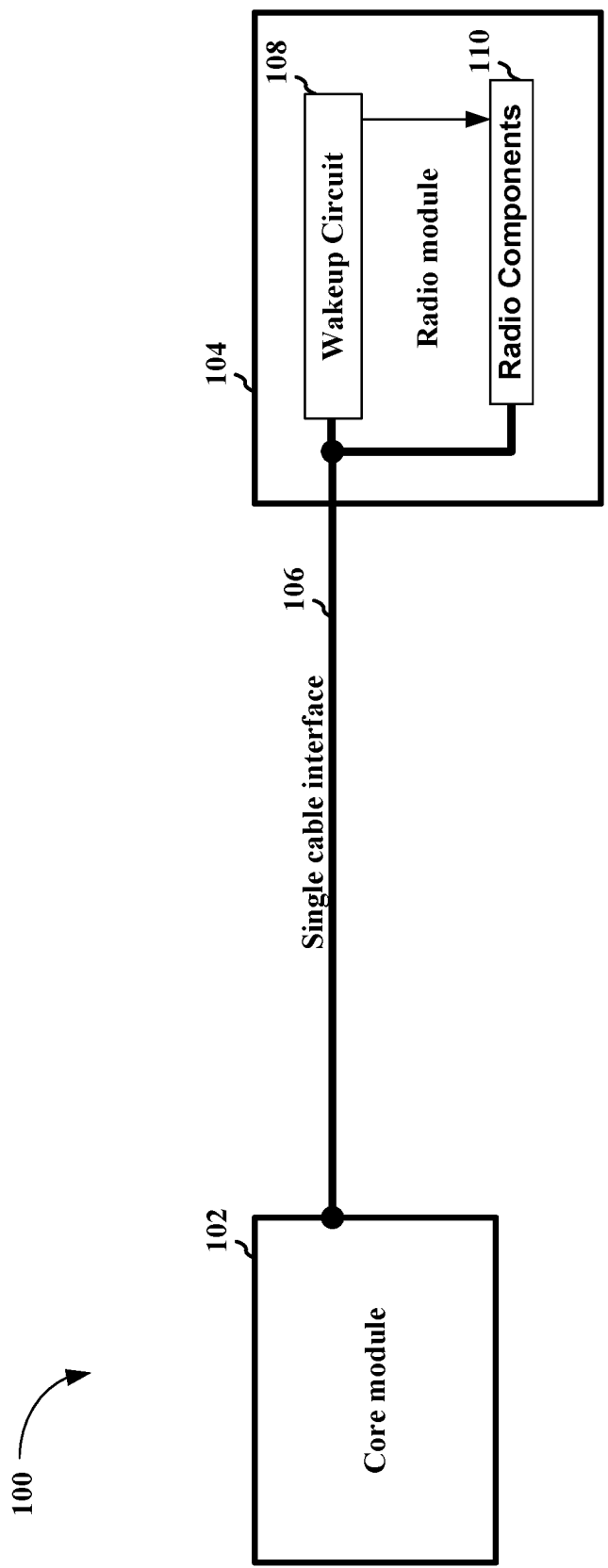
FIG. 1 is a diagram illustrating an example electronic communications system.

FIG. 1 is a diagram illustrating an example electronic communications system 100. The example electronic communications system 100 includes a core module 102, a radio module 104, and a single cable interface 106. The core module 102 may be an application-specific integrated circuit (ASIC). One example of an ASIC is circuitry that may include one or more central processing units (CPUs) or other functionality that may, for example, be incorporated into a mobile telephone handset or other electronic device. For example, the core module 102 may be a mobile station modem (MSM). In a communications system, such as the electronic communications system 100, the core module 102 may be a master circuit in a master circuit/slave circuit configuration. Similarly, the radio module 104 may be a slave circuit in a master circuit/slave circuit configuration.

The radio module 104 may include one or more transceivers, one or more transmitters, or one or more receivers. Accordingly, the radio module 104 may transmit radio signals, receive radio signals, or provide a combination of transmitting radio signals and receiving radio signals. For example, the radio module 104 may provide transceiver functionality to a mobile telephone handset or other electronic communication device. The radio module 104 may transmit and receive electronic signals related to a voice communication, Internet protocol (IP) data transmission, or other electromagnetic communication.

In some examples, the core module 102 may control the radio module 104. Accordingly, the core module 102 and the radio module 104 may be connected. In the illustrated example of FIG. 1, the core module 102 and the radio module 104 are connected using the single cable interface 106. Accordingly, the core module 102 may control the radio module 104 over the single cable interface 106. The single cable interface 106 may act as a coupler configured to couple a remote wake-up signal between a master circuit and the slave circuit using at least one connection of the fixed set of cable connections. The at least one connection may further couple a second signal between the master circuit and the slave circuit.

In some examples, the single cable interface 106 may be a single connection such as a single wire connection, a single fiber optic connection, or another single signal connection. Various signals may be multiplexed over the single cable connection, e.g., the single wire connection. In other examples, the single cable interface 106 may be a single cable including a plurality of connections. (In other words, while the systems and methods described herein may generally be applied to systems using a single wire connection, these systems and methods may also be applied to, for example, one or more individual connections in a fixed plurality of connections in a single cable.) The single cable interface 106 may include a plurality of wire connections, fiber optic connections, other signal connections, or some combination of wire connections, fiber optic connections, or other signal connections between the core module 102 and the radio module 104. The single cable interface 106 may be fixed, however. In other words, there may be a fixed number of connections in the single cable interface 106, and it may not be possible to add additional connections to the single cable interface 106. It may be necessary, however, to provide additional functionality through the single cable interface 106.

In some examples, electrical power may be provided by a battery or batteries. Accordingly, electrical power may be limited, e.g., by the size of the battery. Because electrical power may be limited, it may be desirable to conserve electrical power, e.g., battery power. In some examples, in order to conserve electrical power, the radio module 104 may be turned off. Turning off the radio module 104 may conserve battery power, which may allow for longer periods between battery recharges. Turning off the radio module 104 may also allow for the use of a smaller battery, which may reduce weight. Additionally, in some examples, turning off the radio module 104 may provide for some combination of longer periods between battery recharges and the use of a smaller battery.

In a system where the single cable interface 106 is fixed, additional circuitry may be needed so that signals from the core module 102 related to turning on and off the radio module 104 may be connected over the fixed single cable interface 106. Accordingly, the fixed single cable interface 106 may allow the core module 102 to control turning on and off the radio module 104. The additional circuitry may be a wakeup circuit 108. The wakeup circuit 108 may be needed so that signals from the core module 102 may be used to turn on and off the radio module 104, e.g., the radio components 110 in the radio module. In some examples, the systems and methods described herein may use operational signals, e.g., local oscillator (LO) signals, intermediate frequency (IF) signals, control signals, or DC signals transmitted across the single cable interface to generate local wakeup signals. In other examples, the systems and methods described herein may use dedicated remote wakeup signals transmitted across the single cable interface to generate local wakeup signals. In either set of examples, a same single cable interface may be used for operational signals and wakeup signals (with the operational signals being used for both in one set of examples).

In an example, the radio module 104 may be a 60 GHz radio module. The radio module 104 may be located apart from the core module 102 and may be turned on and off according to link transactions, e.g., signals sent over the single cable interface 106 to turn the radio module 104 on and off. From a power perspective, it may be attractive to consume as little power as possible during idle periods, such as periods when the radio module 104 is not transmitting or receiving. Some example embodiments described herein allow for an almost complete power down of a radio module (or other electronic circuitry). Generally, the only circuitry needed to be powered up in the radio module 104 may be a low-power squelch detector module that initiates a wake-up flow when triggered.

The triggering mechanism may utilize an existing controller, e.g., within the core module 102 between the core and radio chips, e.g., on the radio module 104. Additionally, the triggering mechanism may be activated by simply delivering specific controller transactions from the core chip to the radio module 104.

The radio module 104 may get its voltage supply through the single cable interface 106. The single cable interface may be the cable on which the data and control signals are delivered from the core module 102 to the radio module 104. To save power during idle periods, a system may switch the radio power supply off to the radio module 104. Switching the radio power supply off may provide power savings, but switching the radio power supply off may require a supply switch on the core side, which requires area on a circuit card and which also increases the number of items on the bill-of-materials (BOM). Increases in area on a circuit card and increases in the number of parts may increase cost. Another option is to turn off radio circuitry in the radio module 104. Turning off radio circuitry may require keeping a wake-up circuit in standby mode in order to respond to a wake-up request.

Some examples described herein allow for a complete power down, e.g., of the radio circuitry, e.g., on the radio module 104. Some examples may also implement a low-power circuit that keeps sensing the radio module's 104 single cable interface 106. The very low-power circuit may initiate a wake-up sequence when triggered by a controller in an existing interface of a communications system. In some examples, the control signal may be a digital bit sequence, such as a 125 MHz digital bit sequence. Other digital bit sequences, having other frequencies may be used in other examples.

In some examples, the radio module may include a dedicated wake-up detection circuit as is described herein. During power down, generally, all circuitry may be turned off except a dedicated detector.

In an example, the core module 102 drives a LO signal, e.g., onto the single cable interface 106, to the radio module 104. The core module 102 may require a stable clock as part of the wake-up sequence, e.g., to generate the LO signal and synchronize device operation.

In some examples, the core module 102 or other circuitry may divide and stabilize the LO signal before wake-up. The LO signal may be divided and stabilized before wake-up by using filtering and by using detector hysteresis.

In an example, the radio module 104 may identify a controller transaction and asserts a wake-up signal. When the wake-up signal is detected, the wake-up sequence may begin.

In an example, an existing controller, e.g., core module 102, may be connected to the radio module 104 through a 50Ω coaxial interface, e.g., single cable interface 106, which may include 50Ω terminations on both ends. Disconnecting the 50Ω termination may result in a very high impedance due to high gate capacitance at the input to comparators 312, 314 (see FIG. 3). For wake-up detection purposes it may be useful to maintain a high impedance load. A high impedance load may increase the amplitude at the detector inputs. In an example, the controller amplitude may be ~300 mV peak on a matched load. A higher impedance load may result in up to a doubling of amplitude on the load in one example, e.g., ~600 mV.

Figure 2:
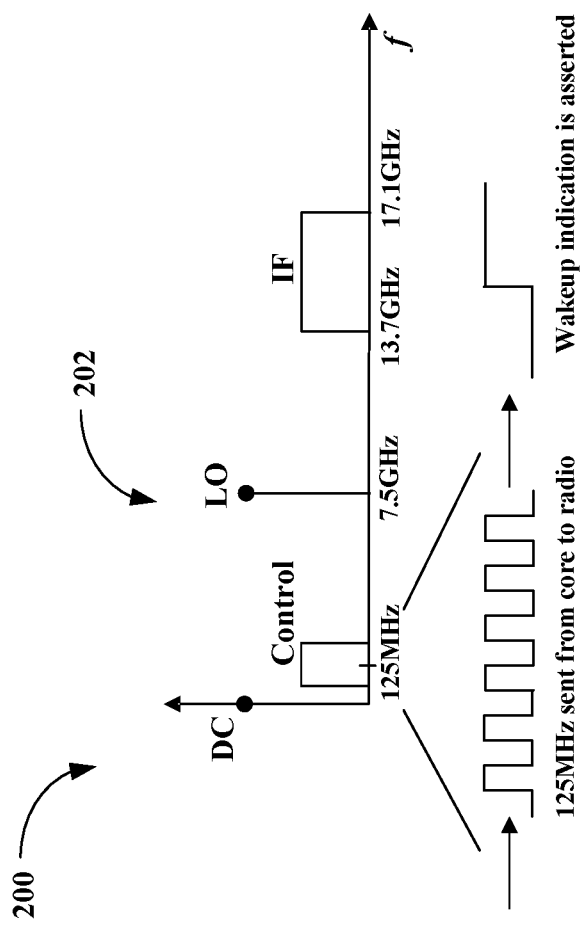
FIG. 2 is a set of diagrams illustrating signals that may be used on a single cable interface between the core module and the radio module.

FIG. 2 is a set of diagrams 200 illustrating signals that may be used on the single cable interface 106 between the core module 102 and the radio module 104. The set of diagrams 200 include an example frequency diagram 202. As illustrated in the example frequency diagram 202, in one example, signals may include DC signals (e.g., a DC voltage), control signals, e.g., centered at a frequency of 125 MHz, LO, e.g., centered at 7.5 GHz, and IF signals, e.g., between 13.7 GHz and 17.1 GHz.

The signals illustrated on the example frequency diagram 202 may be carried on the single cable interface 106. One or more of the signals illustrated on the example frequency diagram 202 may be used to control a power-up sequence on the radio module 104 in addition to the signal's primary function when the radio module 104 is transmitting and/or receiving radio frequency signals. For example, the DC signal illustrated on the example frequency diagram 202 may provide power to the radio module 104 from the core module 102. In one example, however, the DC signal may also be used to control a power-up sequence on the radio module 104. In other examples, signals in the LO or IF frequency ranges may be used to provide an LO or an IF signal when the radio module is transmitting and/or receiving radio frequency signals. Additionally, signals in the LO or IF frequency ranges may also be used to control the power up sequence of the radio module 104.

In another example, the control signals may primarily be used to control the radio module 104 when the radio module 104 is transmitting and/or receiving radio frequency signals. The control signals may also be used to control a power-up sequence on the radio module 104 without adding additional connections between the core module 102 and the radio module 104 on the single cable interface 106, which, as discussed above, may be fixed. For example, as illustrated in FIG. 2, a 125 MHz pulse train may be transmitted over the single cable interface 106 to indicate that the radio module 104 should power up.

Figure 3:
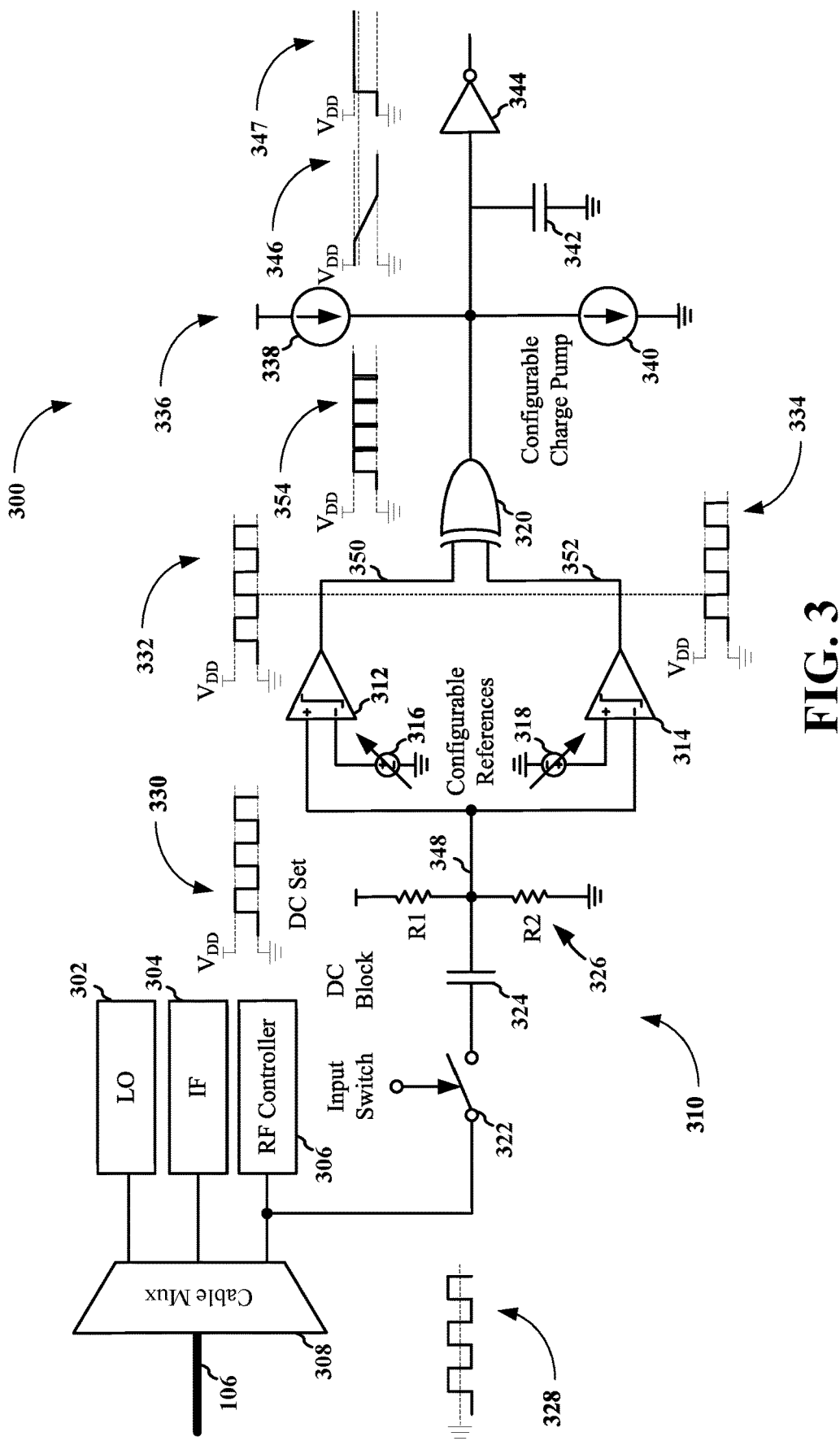
FIG. 3 is a diagram illustrating an example of wake-up circuitry in accordance with the systems and methods described herein.

FIG. 3 is a diagram illustrating an example of wake-up circuitry 300 in accordance with the systems and methods described herein. The wake-up circuitry 300 may be within the radio module 104 discussed with respect to FIG. 1. For example, the entire circuit illustrated in FIG. 3 may be within the radio module 104. The diagram of the wake-up circuitry 300 includes RF circuitry such as an LO 302, an IF generator 304, and a controller 306. The LO 302 generates an LO signal, e.g., at 7.5 GHz. The IF generator 304 generates IF signals, e.g., between 13.7 GHz and 17.1 GHz. The LO 302 and the IF generator 304 may be considered separate from the wake-up circuitry. The controller 306 generates local control signals that may control the radio module 104 of FIG. 1 when the radio module 104 is transmitting and/or receiving RF signals. The LO 302, the IF generator 304, and the controller 306 are connected to a cable multiplexer (cable mux) 308. The cable multiplexer 308 may receive signals from the core module 102 of FIG. 1 over the single cable interface 106. Thus, the RF controller 306 may communicate with an RF controller within core module 102. Additionally, the cable multiplexer 308 may be used to multiplex signals for the LO 302, the IF generator 304, and the controller 306 from an output of the cable multiplexer 308. The cable multiplexer 308 may be coupled to a connection on the single cable interface 106 of FIG. 1.

In the illustrated example of FIG. 3, the input of the controller 306 is coupled to circuitry 310. The circuitry 310 may be used to generate a signal to wake up the radio module 104 of FIG. 1. The radio module 104 may be powered down or partially powered down to conserve electrical power, e.g., battery power. Accordingly, the radio module may need to be powered up when the radio module 104 is needed to transmit or receive an RF signal or RF signals.

The circuitry 310 in the illustrated example of FIG. 3 includes two comparators 312, 314, two configurable references 316, 318, and an exclusive OR gate 320. A signal from the core module 102 (connected by the single cable interface 106) may be coupled to the comparators 312, 314 through an input switch 322, a DC block capacitor 324, and a DC set 326 that includes a pair of resistors R1, R2.

The input switch 322 may be used to connect and disconnect the controller signal from the comparators 312, 314. The input switch 322 allows for input isolation for quiet DC calibration. The DC block capacitor 324 may be used to filter the controller signal to block any DC value on the controller signal. The DC set 326 is a resistor divider. The DC set 326 includes two resistors R1, R2 that act as a voltage divider. The DC set 326 may be used to superimpose a particular DC value onto the filtered control signal, e.g., after the DC block capacitor 324. The particular DC value superimposed by the DC set 326 is a function of the two resistor values R1, R2. The DC value in the illustrated example of FIG. 3 is equal to:

$$V_{DC} = \frac{R_2}{R_1 + R_2}$$

As illustrated in the example of FIG. 3, the controller 306 may output a square wave 328 centered at ground. In other words, the square wave 328 output from the controller 306 in the illustrated example may have a voltage swing between a negative voltage and a positive voltage centered at zero volts. The magnitude of the negative voltage and the magnitude of the positive voltage may be equal or approximately equal. The DC block capacitor 324 may remove or reduce any DC value from the signal, e.g., the square wave 328 resulting in a signal at 348. The DC set 326 may be used to adjust the signal after filtering by the DC block capacitor so that the signal, e.g., a square wave 330, swings between a positive voltage, such as $V_{DD}$, and a ground voltage, e.g., 0 volts.

The comparator 312 may compare the input signal to a configurable reference 316. For example, an output of the configurable reference 316 may be coupled to an input of the comparator 312. More specifically, in the illustrated example of FIG. 3, the output of the configurable reference 316 is coupled to the negative input of the comparator 312. When the voltage of the input signal is higher than the output voltage of the configurable reference 316 an output 350 of the comparator 312 will be high. The comparators 312, 314 may provide hysteresis during operation of the wake-up circuit 300. In some examples, the hysteresis may decrease the incidence of false positive results at the output of the comparators 312, 314.

As illustrated in FIG. 3, each comparator 312, 314 has a configurable reference 316, 318. These configurable references 316, 318 may serve two purposes. First, the configurable references 316, 318 may be used to set a comparator offset. A minimum allowed reference may be determined by shorting inputs to the comparators 312, 314 and setting the reference to a minimum value that always achieves '0' output level. Second, the configurable references 316, 318 may be used to determine a detection threshold. Different references may be used in different environments, e.g., different source supplies, cable lengths, and/or noise. Accordingly, the different references may allow the circuit of FIG. 3 to compensate for different amplitudes due to different source supplies, cable lengths, and noise.

Similarly, the comparator 314 may compare the input signal to a configurable reference 318. For example, an output of the configurable reference 318 may be coupled to an input of the comparator 314. More specifically, in the illustrated example of FIG. 3, the output of the configurable reference 318 is coupled to the positive input of the comparator 314. When the voltage of the input signal is lower than the output voltage of the configurable reference 318 an output of the comparator 314 will be high.

The outputs 350, 352 of the comparators 312, 314 may be combined using an exclusive-OR gate 320. The exclusive OR gate 320 has a "true" output ("1"/"high") when one, and only one, of the inputs to the exclusive OR gate 320 is true. Accordingly, the output of the exclusive OR gate 320 is high when either of the comparators 312, 314, has a high output, but both of the comparators 312, 314 do not have high outputs. Thus, the exclusive OR gate 320 may be used to combine "mutually exclusive" successive comparisons to a single signal, e.g., a pulse train. The output of the exclusive OR gate 320 is low when both of the comparators 312, 314 have a low output 350, 352 and when both of the comparators 312, 314 have high outputs.

In an example, hysteresis in the comparators 312, 314 may be used for noise immunity and mismatch correction. Additionally, tuning the configurable references 316, 318 may allow for some control of conversion speed between when a signal is received and when a local turn-on signal is generated because changes in the voltage being compared to the square wave 328 made by changing the configurable references 316, 318 may impact when switching occurs. (Earlier switching may allow for faster conversion speed.)

The square wave 328 (after filtering and DC leveling set) may be compared to the configurable references 316, 318 by the comparators 312, 314, respectively. The comparator 312 outputs a square wave 332. The comparator 314 outputs a square wave 334. When the square wave 332 and the square wave 334 are combined in the exclusive OR gate 320, the waveform 354 results. As illustrated in FIG. 3, square wave 332 and square wave 334 may be out of phase with each other such that the waveform 346 is at a high value for a large percentage of the time and a low value only briefly, e.g., generally when the square waves 332, 334 are switching. The configurable charge pump 336 includes a pair of current sources 338, 340. Accordingly, the configurable charge pump 336 may provide a current that may be used to convert the waveform 354 to a DC value. Charge and discharge fluctuations may generally still be on the signal, but may be filtered out by the capacitor 342. The capacitor 342 may filter out any high-frequency component to the waveform 346. Accordingly, coupling the waveform 346 to the configurable charge pump 336 and the capacitor 342 may result in a waveform 346.

One or more components, including the comparators 312, 314; configurable references 316, 318; exclusive OR gate 320, charge pump 336, capacitor 342, or inverter 344, may act as a wake-up signal generator configured to generate a local wake-up signal at the slave circuit based on detecting the remote wake-up signal coupled between the master circuit and the slave circuit and wake up the slave circuit with the local wake-up signal. Generally, the wake-up signal generator may include several of these components in order to generate the local wake-up signal.

The output of the exclusive OR gate 320, e.g., represented by the waveform 354, may control the configurable charge pump 336. In one example, the outputs of both the comparators 312, 314 may initially both be low. Accordingly, both inputs to the exclusive OR gate 320 may be low and the output of the exclusive OR gate 320 may initially be low. When the output of the exclusive OR gate 320 is low the current supply 338 in the charge pump may drive current to a capacitor 342. Accordingly, the capacitor 342 may be charged by the current from the current source 338.

When an input signal is detected, the input to the comparator 312 may begin to toggle above the positive thresholds for the comparator 312. Similarly, when an input signal is detected, the input to the comparator 314 may begin to toggle below the negative thresholds for the comparator 314. Accordingly, the outputs to the comparators 312, 314 begin to toggle and the output of the exclusive OR gate 320 toggles accordingly.

Generally, the output of the exclusive OR gate 320 may be high longer than it is low when the output of the exclusive OR gate 320 is toggling, as illustrated by the waveform 354. When the output of the exclusive OR gate 320 is high, the current source 338 is off. The current source 340 in the configurable charge pump 336 may then discharge the capacitor 342 as discussed below. When the current source 340 discharges the capacitor 342, the output voltage of the charge pump 336 may decrease.

When the capacitor 342 is discharged through the current source 340 of the configurable charge pump 336, the voltage of the waveform 346 falls to a low input value (e.g., below the dotted line between ground and $V_{DD}$). Accordingly, the input to the inverter 344 may be a valid low input and the output of the inverter 344 (generally after some delay through the inverter 344) may rise from a logic low value to a logic high value as illustrated by a waveform 347. The inverter 344, may convert the configurable charge pump output to a valid digital level. In another example, the output buffer may be an inverter.

Figure 4:
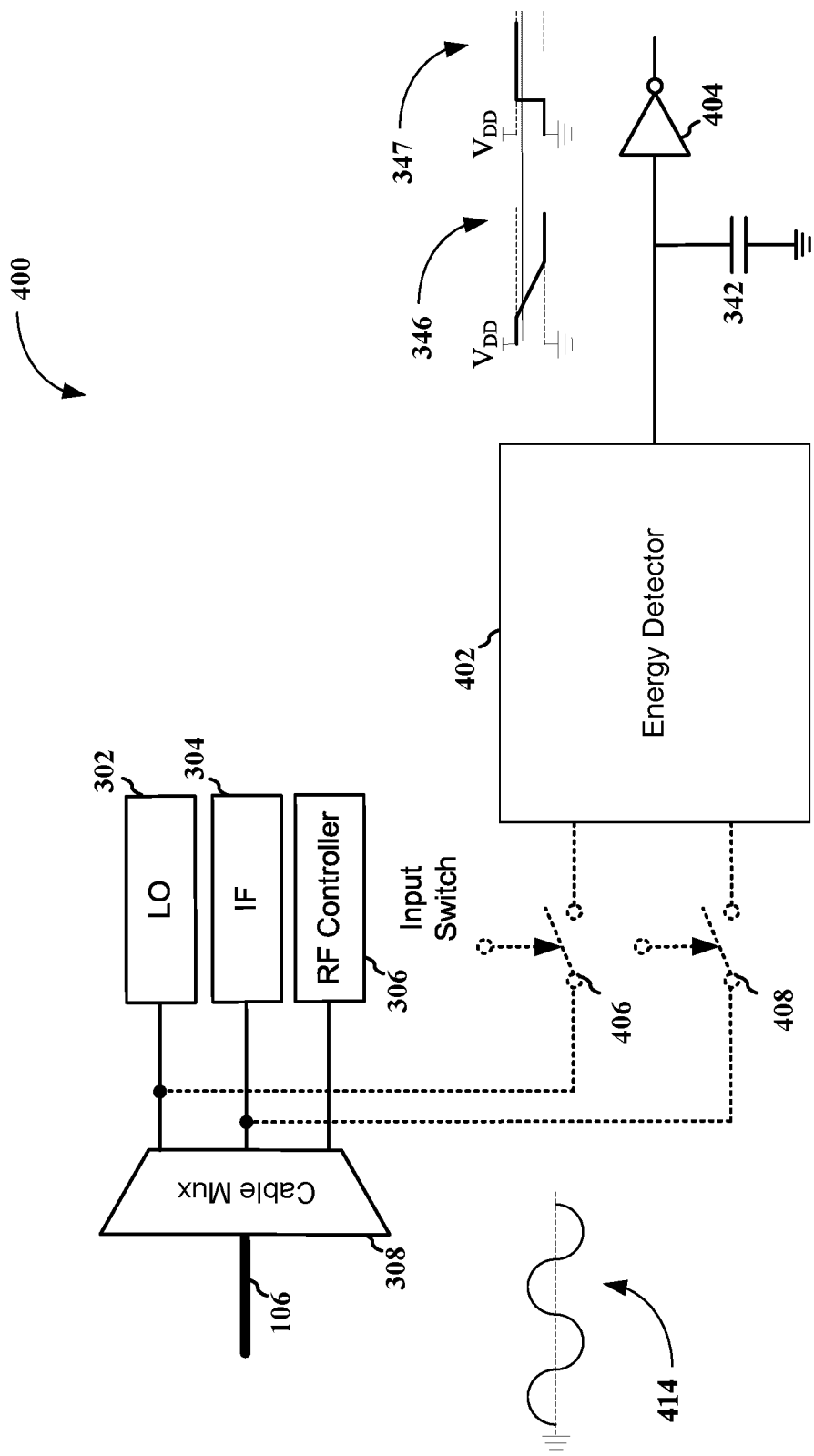
FIG. 4 is a diagram illustrating an example of wake-up circuitry in accordance with the systems and methods described herein.

FIG. 4 is a diagram illustrating an example of wake-up circuitry 400 in accordance with the systems and methods described herein. The wake-up circuitry 400 may be within the radio module 104 discussed with respect to FIG. 1. The diagram of FIG. 4 includes RF circuitry, some of which is also illustrated in FIG. 3, such as the LO 302, the IF generator 304, and the controller 306. As discussed above with respect to FIG. 3, the LO 302 generates the LO signal, the IF generator 304 generates the IF signals, and the controller 306 generates control signals. The LO 302, the IF generator 304, and the controller 306 are connected to a cable multiplexer 308. The cable multiplexer 308 may receive signals from the core module 102 of FIG. 1 over the single cable interface 106. Additionally, the cable multiplexer 308 may be used to multiplex signals for the LO 302, the IF generator 304, and the controller 306 from an output of the cable multiplexer 308. In the illustrated example of FIG. 4, the input of the LO 302 is coupled to circuitry that may be used to generate a signal to wake up the radio module 104 of FIG. 1. The input of the LO 302 may be coupled to the core module 102 over the single cable interface 106. The core module 102 may be coupled to the energy detector 406 through the input switch 406. In another example, the input of the IF 304 is coupled to the circuitry, e.g., instead of the input of the LO 302. The input of the IF generator 304 may be coupled to the core module 102 over the single cable interface 106. The core module 102 may be coupled to the energy detector through an input switch 408. The circuitry in the illustrated example of FIG. 4 includes an energy detector 402. The energy detector 402 may detect energy from an LO signal input to the LO 302 from the core module 102. In another example, the energy detector 402 may detect energy from an IF signal input to the IF generator 304 from the core module. The presence of energy from an LO signal or an IF signal, as determined by the energy detector 402, may provide an indication that the radio module 104 should wake up. The output of the energy detector 402 may be filtered by a capacitor 342 and buffered by an inverter 404. The inverter 404 may provide some amount of hysteresis. Hysteresis is a time-based dependence of a system's output on present and past inputs. Hysteresis may be used in an electronic circuit to prevent unwanted rapid switching. Accordingly, the hysteresis in the inverter 404 may help to prevent false positives from the energy detector 402.

One or more components, including the energy detector 402, the capacitor 342, or the capacitor 404, may act as a wake-up signal generator configured to generate a local wake-up signal at the slave circuit based on detecting the remote wake-up signal coupled between the master circuit and the slave circuit and wake up the slave circuit with the local wake-up signal. Generally, the wake-up signal generator may include several of these components in order to generate the local wake-up signal.

The LO 302 or the IF generator 304 may output a sinusoidal signal 414 centered at ground. Energy from the sinusoidal signal 414 may be detected by the energy detector 402. The presence of energy from the sinusoidal signal 414, as detected by the energy detector 402, may be an indication that the radio module 104 should wake up. (The inverter of FIG. 3 may also have hysteresis in some examples.)

Figure 5:
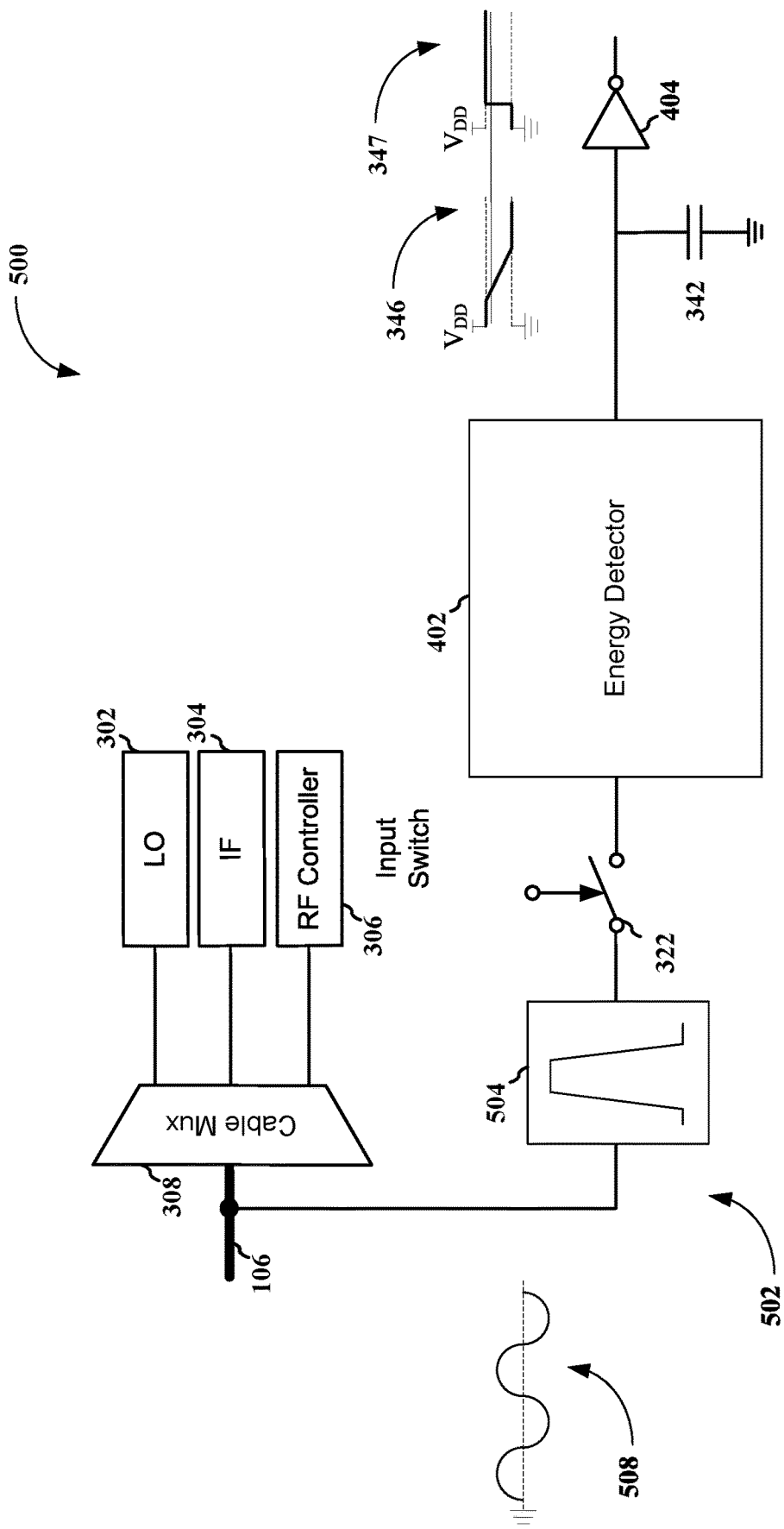
FIG. 5 is a diagram illustrating an example of wake-up circuitry in accordance with the systems and methods described herein.

FIG. 5 is a diagram illustrating an example of wake-up circuitry 500 in accordance with the systems and methods described herein. The wake-up circuitry 500 may be within the radio module 104 discussed with respect to FIG. 1. The diagram includes RF circuitry, some of which is also illustrated in FIGS. 3 and 4, such as the LO 302, the IF generator 304, the controller 306, the cable multiplexer 308, and the input switch 322. The wake-up circuitry 500 provides an example of circuitry 500 that allows for a wake-up signal at an arbitrary frequency, e.g., not the LO frequency, the IF frequency, or the control frequency. (The LO frequency, the IF frequency, or the control frequency may be used in conjunction with one or more of the examples with respect to FIGS. 3-4, as described above.)

The input of the cable multiplexer 308 may be coupled to circuitry 502. For example, the input of the cable multiplexer 308 may be coupled to the circuitry 502 through an input filter 504 and through the input switch 322. The input filter 504 illustrated in FIG. 5 may be a band-pass filter. The band-pass filter may be in parallel with the multiplexer 308. Selection of a frequency range of the band-pass filter may allow for the use of an arbitrary frequency other than the LO frequency, the IF frequency, or the control frequency. For example, the frequency range of the band-pass filter may be selected to match the desired arbitrary frequency for the wake-up signal.

The circuitry 502 in the illustrated example of FIG. 5 includes the energy detector 402, which was first discussed with respect to FIG. 4. The energy detector 402 may detect energy from the LO signal, the IF signal, or the controller signal, depending on the state of the cable multiplexer 308, i.e., depending on which signal input is selected at the multiplexer and routed to the output of the multiplexer. Generally, the energy detector 402 may be used when either the LO signal or the IF signal are selected. Some examples may select the control signals, however. Energy being detected by the energy detector 402 may provide an indication that the radio module 104 should wake up. The output of the energy detector 402 may be filtered by the capacitor, 342, and buffered by an inverter 404. Additionally, the inverter 404 may provide some amount of hysteresis. The hysteresis may help to prevent false positives from the energy detector 402.

The LO 302, the IF generator 304, or the controller may output a sinusoidal signal 508 centered at ground. Energy from the sinusoidal signal 508 may be detected by the energy detector 402. The presence of energy from the sinusoidal signal 508 may be an indication that the radio module 104 should wake up.

Figure 6:
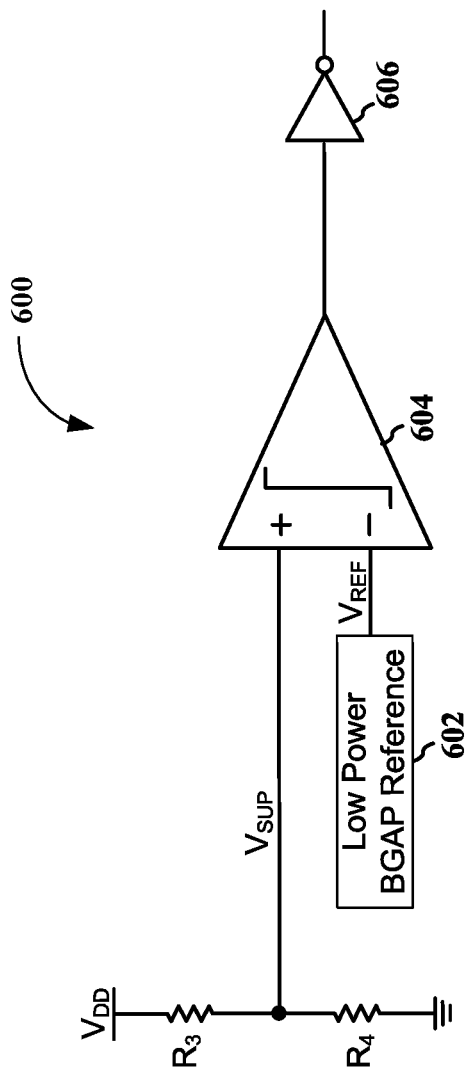
FIG. 6 is a diagram illustrating an example of wake-up circuitry in accordance with the systems and methods described herein.

FIG. 6 is a diagram illustrating example wake-up circuitry 600 in accordance with the systems and methods described herein. The wake-up circuitry 600 may be within the radio module 104 discussed with respect to FIG. 1. The diagram illustrates an example that may use a DC signal from the single cable interface 106 to make a determination to wake up the radio module 104 of FIG. 1. A DC signal from the single cable interface 106 may be connected to a comparator 604 through a pair of resistors $R_3$, $R_4$. The pair of resistors $R_3$, $R_4$ form a voltage divider that may divide the DC signal, $V_{DD}$. The divided voltage is referred to as $V_{SUP}$ in FIG. 6.

$$V_{SUP} = \frac{R_4}{R_3 + R_4}$$

The voltage divided DC signal produced, $V_{SUP}$, may be an input to a positive input line of the comparator 604. A low-power reference 602 may provide a voltage reference, $V_{REF}$, to the negative input of the comparator 604. Accordingly, $V_{SUP}$ and $V_{REF}$ may be compared by the comparator 604. An output of the comparator may be generated based on the comparison of $V_{SUP}$ and $V_{REF}$. In some examples, a decrease in $V_{DD}$ may be used to signal that a radio module 104 should be powered up, and more particularly that the radio components 110 should power up. In some other examples, a decrease in $V_{DD}$ may be used to signal a power up. In some other examples, a slight reduction in $V_{DD}$, e.g., during power down, followed by an increase to nominal voltage on $V_{DD}$ may be used to initiate power up. In still other examples, a slight increase in $V_{DD}$, e.g., during power down, followed by a decrease to nominal voltage on $V_{DD}$ may be used to initiate power up.

The output of the comparator 604 may be buffered by an inverter 606 that may also provide hysteresis to help filter out noise that may cause inadvertent or unwanted changes to the output of the comparator 604. One or more components, including the low-power reference 602, the comparator 604, or the inverter 606, may act as a wake-up signal generator configured to generate a local wake-up signal at the slave circuit based on detecting the remote wake-up signal coupled between the master circuit and the slave circuit and wake up the slave circuit with the local wake-up signal. Generally, the wake-up signal generator may include several of these components in order to generate the local wake-up signal.

Figure 7:
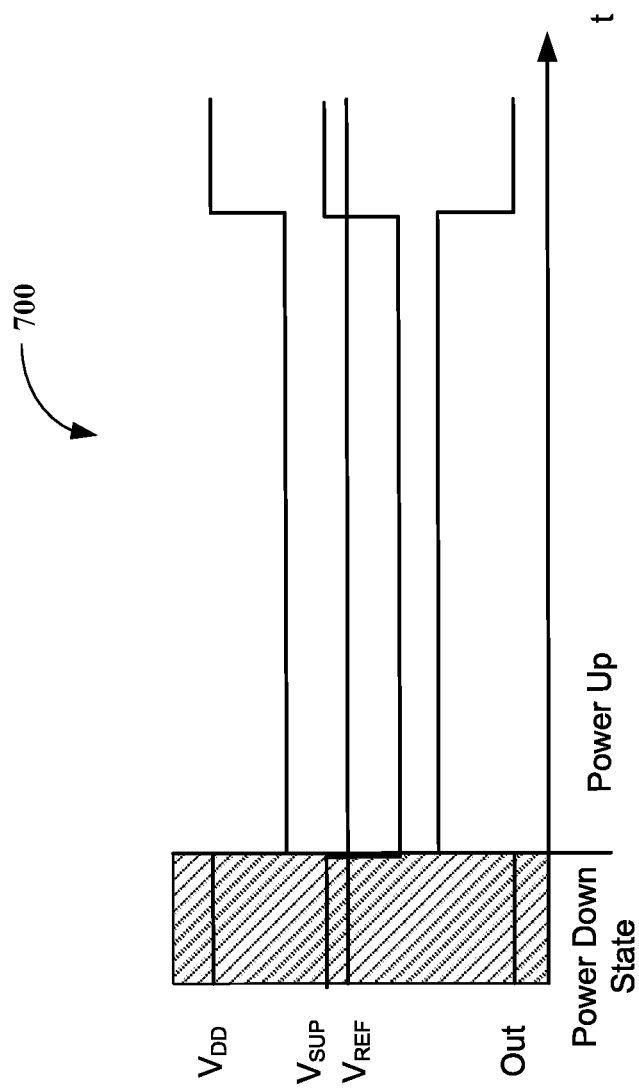
FIG. 7 is a diagram illustrating various voltage signals that may be used in conjunction with the diagram of FIG. 6.

FIG. 7 is a diagram 700 illustrating various voltage signals that may be used in conjunction with the diagram of FIG. 6. During a power down state of the radio module, $V_{DD}$ may still be active. Assuming $V_{DD}$ is a positive voltage, the voltage $V_{SUP}$ may be higher than the voltage $V_{REF}$. Accordingly, the output of the comparator 604 may be high, and the output of the inverter 606 may be low when the radio module 104 is in a power down state. When the radio module 104 of FIG. 1 is to be powered up, the core module 102 may drop the voltage $V_{DD}$ momentarily. When the voltage $V_{DD}$ is momentarily dropped, the voltage $V_{SUP}$ will also momentarily drop, as indicated in FIG. 7. When the voltage $V_{SUP}$ is lower than the voltage $V_{REF}$ the output of the comparator 604 will transition to a low value, and the output of the inverter 606 will transition to a high value. When the voltage $V_{DD}$ is then raised, the voltage $V_{SUP}$ will also rise as indicated in FIG. 7. When the voltage $V_{SUP}$ is higher than the voltage $V_{REF}$ the output of the comparator 604 will transition to a high value, and the output of the inverter 606 will transition to a low value.

Figure 8:
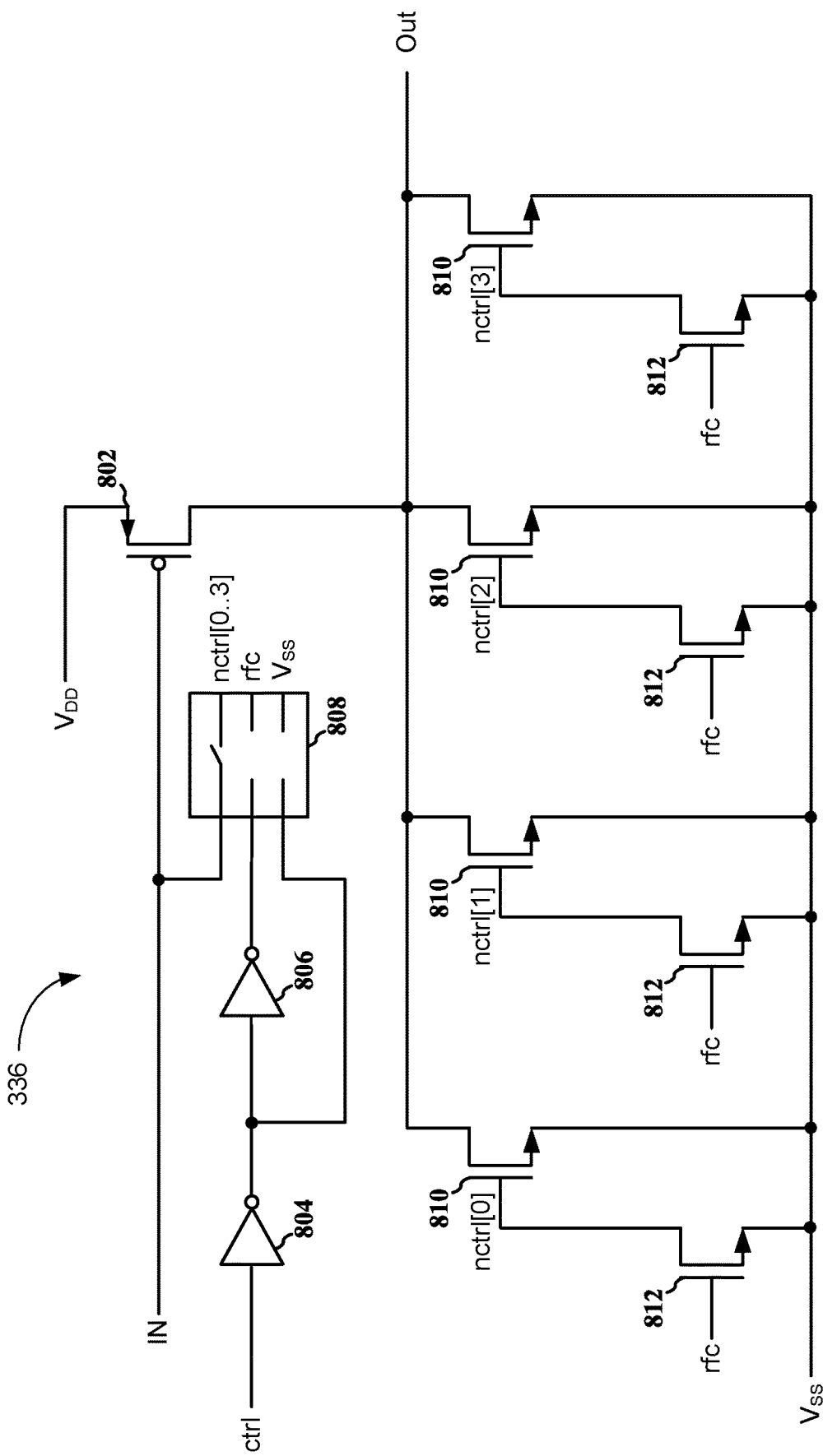
FIG. 8 is a diagram illustrating an example of a configurable charge pump that may be used in the wake-up circuit of FIG. 3.

FIG. 8 is a diagram illustrating an example configurable charge pump 336 that may be used in the wake-up circuit of FIG. 3. Recall from the discussion of FIG. 3 that the configurable charge pump 336 includes the current source 338 and the current source 340. A PMOS transistor 802 may provide the current source 338 illustrated in FIG. 3. The PMOS transistor 802 is coupled to a voltage, $V_{DD}$, and controlled by the input, IN. When IN is low, the PMOS transistor 802 is on, and current may flow through the PMOS transistor 802.

The current source 340 may be provided by NMOS transistors 810, 812. When IN is high, and the switch in component 808 is active, the NMOS transistors 810 are active. The NMOS transistors 812 are controlled by the signal rfc, which may be a function of a control input (ctrl) depending on the state of switches in the component 808. The inverters 804, 806 may invert and buffer the control input (ctrl). Accordingly, the rfc signal may be equal to the control signal (ctrl). Alternatively, depending on the state of the switches in the component 808, rfc may be a low value based on an inversion of $V_{SS}$ through inverter the 806.

As discussed above, the output of the exclusive OR gate 320, e.g., represented by the waveform 354, may control the configurable charge pump 336. In one example, the outputs of both the comparators 312, 314 may initially both be low. Accordingly, both inputs to the exclusive OR gate 320 may be low and the output of the exclusive OR gate 320 may initially be low. The current supply 338 may be provided by the PMOS transistor 802. The PMOS transistor 802 may connect $V_{DD}$ to the capacitor 342 when the PMOS transistor 802 is on. The PMOS transistor 802 may be on when the output of the exclusive OR gate 320 is low. Accordingly, the capacitor 342 may be charged with current from the connection to $V_{DD}$.

When an input signal is detected, the input to the comparator 312 may begin to toggle above the positive thresholds for the comparator 312. Similarly, when an input signal is detected, the input to the comparator 314 may begin to toggle below the negative thresholds for the comparator 314. The outputs of the comparators 312, 314 begin to toggle and the output of the exclusive OR gate 320 toggles accordingly.

As discussed above, generally, the output of the exclusive OR gate 320 may be high longer than it is low when the output of the exclusive OR gate is toggling. When the output of the exclusive OR gate 320 is high, the PMOS transistor 802 is off. The NMOS transistor(s) 810, 812 in the configurable charge pump 336 may then discharge the capacitor 342 and the voltage across the capacitor 342 may decrease.

In one example, the configurability of the configurable charge pump 336 is, at least in part, due to the use of a parallel array of multiple NMOS transistors, e.g., the NMOS transistors 810, 812. The number of NMOS transistors 810, 812 used, the size of the NMOS transistors 810, 812 used, or a combination of both number and size may control the slope of a voltage decrease across the capacitor 342. The number of NMOS transistors 810, 812 used may be selectable. (The NMOS transistors 810 may be the primary transistors used to configure the charge pump. In some examples, the NMOS transistors 812 may generally be on at the same time and may be used to enable or disable each of the potential current paths to $V_{SS}$.)

A voltage decrease across the capacitor 342 is illustrated in the waveform 346. Using a larger number of NMOS transistors 810, 812 or larger NMOS transistors 810, 812 may increase the speed of the discharge from the capacitor 342 because more transistors or larger transistors may generally carry more current than fewer transistors or smaller transistors. Each gate of each NMOS transistor 810 may be controlled by one or more control lines: nctrl[0], nctrl[1], nctril[2], nctril[3]. The example control lines nctrl[0], nctrl[1], nctril[2], nctril[3] may be connected through switches (illustrated as a single switch) to either the exclusive OR 320 output, which is an input of the configurable charge pump, e.g., "IN" in FIG. 8. The connection to IN may be used when the NMOS transistors 810 is enabled and the NMOS transistor is intended to contribute to the discharge of the capacitor 342. Alternatively, the example control lines nctrl[0], nctrl[1], nctril[2], nctril[3] may be connected to ground (or a low output from the inverter 806), e.g., when the NMOS transistors 810 is disabled. The NMOS transistors 812 may be used to enable or disable the current path to $V_{SS}$.

The enabled NMOS transistors 810 and the single PMOS transistor 802 may be connected to the exclusive OR gate 320 output ("IN" in FIG. 8). The slope on waveform 346 may be based on the discharge of the capacitor 342. The slope of the discharge of the capacitor 342 may depend on the ratio of PMOS transistors 802 to NMOS transistors (or the ratio of currents through the PMOS transistors 802 to NMOS transistors).

The configurable charge pump 336 may convert the comparators' 312, 314 signal, e.g., pulse train (waveform 346) to a DC value (346). The configurable charge pump 336 may be tunable. The PMOS transistor 802 and the tunable NMOS transistor(s) 810, 812 may adjust charge and discharge path relationships, allowing slower or faster pulse-DC conversion. For faster detection or compensation, a larger NMOS device (or more NMOS transistors 810, 812) may be used. If false alarms occur, a smaller NMOS device (or fewer NMOS transistors) may be used to slow the mechanism's response. For calibration, each comparator 312, 314 may be calibrated separately.

In some examples, an embodiment serves as a low-power wake-up detector of <50 uA current consumption that is embedded in a radio module, e.g., 60 GHz radio module. The low-power wake-up detector may be kept operating during power down mode while the rest of the chip may be turned off. The low-power wake-up detector's operation may be based on a square wave signal of 125 MHz (e.g., square wave 328 of FIG. 3) from a matched 50Ω source which is used to initiate a power up sequence. Some examples may eliminate an external onboard power switch in the core edge because the radio module 104 does not need to be powered down using a switch using the systems and methods described herein. The systems and methods described herein may still allow for a deep power down mode of the radio module 104 with very low current consumption.

Some examples of wake-up circuitry (300) include a first comparator (312) coupled to an input signal (348). The first comparator (312) is configured to compare the input signal (348) to a first comparison value (316). The example includes a second comparator (314) coupled to the input signal (348). The second comparator (314) is configured to compare the input signal (348) to a second comparison value (318). The example includes an exclusive OR gate (320). A first input of the exclusive OR gate (320) is coupled to an output (350) of the first comparator. A second input of the exclusive OR gate (320) is coupled to an output (352) of the second comparator. The example includes a configurable charge pump (336) coupled to an output of the exclusive OR gate (320) and configured to convert a signal, e.g., a pulse train (354) from the exclusive OR gate (320) to a DC value (346) to wake up a circuit being monitored. (As described herein, the "DC value" waking up a circuit being monitored includes, for example, the output of the exclusive OR gate 320 as well as level shifted, filtered, or otherwise processed versions of the DC value.)

The example may include a buffer (344) configured to convert the DC value to a digital voltage level (347). The buffer (344) may be an inverter (344). The example may further include an input switch (322) configured to isolate the input signal for DC calibration. The example may further include a DC block capacitor (324) coupling the input switch (322) to the input signal (328). The example may further include a DC set circuit (326).

Some example wake-up circuits include a fixed set of cable connections (106) to couple a remote wake-up signal (328) between a master circuit (102) and the slave circuit (104) using at least one connection of the fixed set of cable connections (106). The slave circuit (104) detects the remote wake-up signal (328) coupled between the master circuit (102) and the slave circuit (104). The slave circuit (104) generates a local wake-up signal (354, 346, 347) based on detecting the remote wake-up signal (328) coupled between the master circuit (102) and the slave circuit (104). The example wakes up the slave circuit (104) based on the local wake-up signal (354, 346, 347).

The at least one connection further couples a second signal (328) between the master circuit (102) and the slave circuit (104). (The first signal may be the LO, IF, or control signals generated to power up the radio module. The second signal may be the LO, IF, or control signals generated during operation of the radio module.)

The example may couple the second signal (328) between the master circuit (302) and the slave circuit (304) for at least a period of time when the slave circuit (304) is awake. The example may compare an input signal (348) to a first comparison value (326) to generate a first comparison result (350). The example may compare the input signal (348) to a second comparison value (318) to generate a second comparison result (352). The example may combine the first comparison result (350) and the second comparison result (352) to generate a signal, e.g., a pulse train (354).

In an example, detecting the remote wake-up signal (328) may further include detecting energy from the remote wake-up signal using an energy detector (402). In an example, a remote wake-up signal includes a DC voltage ($V_{DD}$). In an example, detecting the remote wake-up signal (328) further includes detecting a DC voltage ($V_{DD}$, $V_{SUP}$). In an example, the remote wake-up signal includes a control signal (306). In an example, the remote wake-up signal includes an IF signal (304). In an example, the remote wake-up signal includes an LO signal (302). In an example, the remote wake-up signal selectively includes one of a control signal (306), an IF signal (304), or an LO signal (302). In an example, a cable multiplexer (308) may select one of the control signal (306), the IF signal (304), or the LO signal (302) as the remote wake-up signal. Additionally, an example may filter (324, 504) the remote wake-up signal (302, 304, 306).

Figure 9:
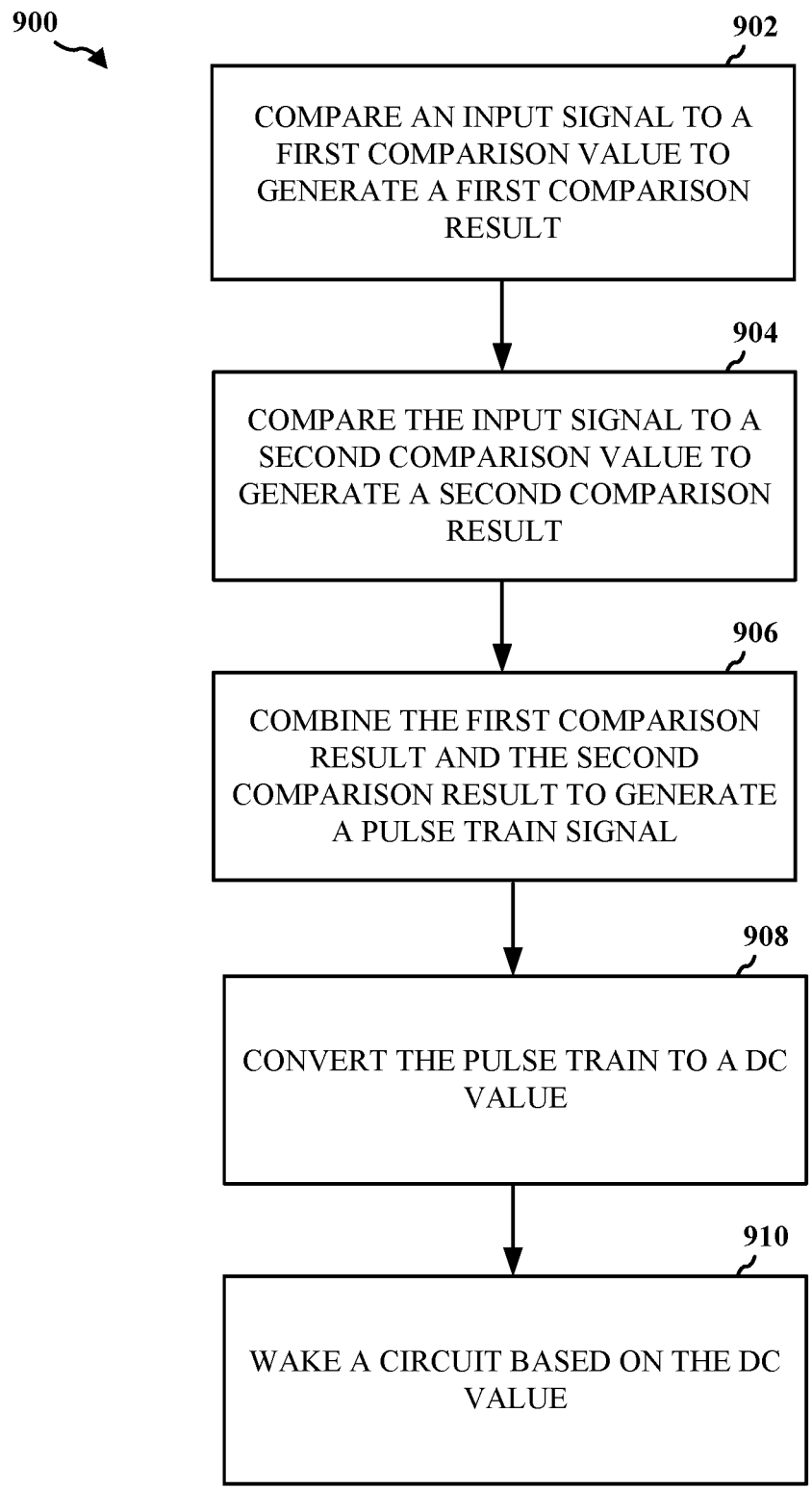
FIG. 9 is a flowchart illustrating an example method in accordance with the systems and methods described herein.

FIG. 9 is a flowchart 900 illustrating an example method in accordance with the systems and methods described herein. The method may be implemented in wake-up circuitry (300) to wake up a powered down circuit (104). Block 902, compares (312) an input signal (348) to a first comparison value (316) to generate a first comparison result (350). The compared input value may be an LO signal (302), IF signal (304), or control signal (306). The compared input value may be DC filtered by the capacitor 324 and DC set by the resistors $R_1$ and $R_2$.

Block 904, compares (314) the input signal (348) to a second comparison value (318) to generate a second comparison result (352). The compared input value may be an LO signal (302), IF signal (304), or control signal (306). The compared input value may be DC filtered by the capacitor 324 and DC set by the resistors $R_1$ and $R_2$.

Block 906, combines (320) the first comparison result (350) and the second comparison result (352) to generate a signal, e.g., a pulse train (354). The first comparison result (350) and the second comparison result (352) may be combined using the exclusive OR gate 320, or other logic circuitry.

Block 908, converts (336) the signal (354) to a DC value (346). The signal, e.g., a pulse train, may be converted by the configurable charge pump 336 that may include the current sources 338, 340.

Block 910, wakes up the powered down circuit (104) based on the DC value (346). For example, the DC value (346) or a digital version of the DC value (347) may be used to wake a radio module 104. As described herein, the term DC value, as used in the claims, includes the DC value (346) as well as filtered, DC shifted, or otherwise processed versions of the DC value (346).

In some examples, the method may further include buffering (344) the DC value (346) to convert the DC value to a digital voltage level (346). Buffering (344) the DC value (346) may include using an inverter to buffer (344) the DC value (346). Some examples may include switching (322) the input signal to isolate the input signal for DC calibration.

Figure 10:
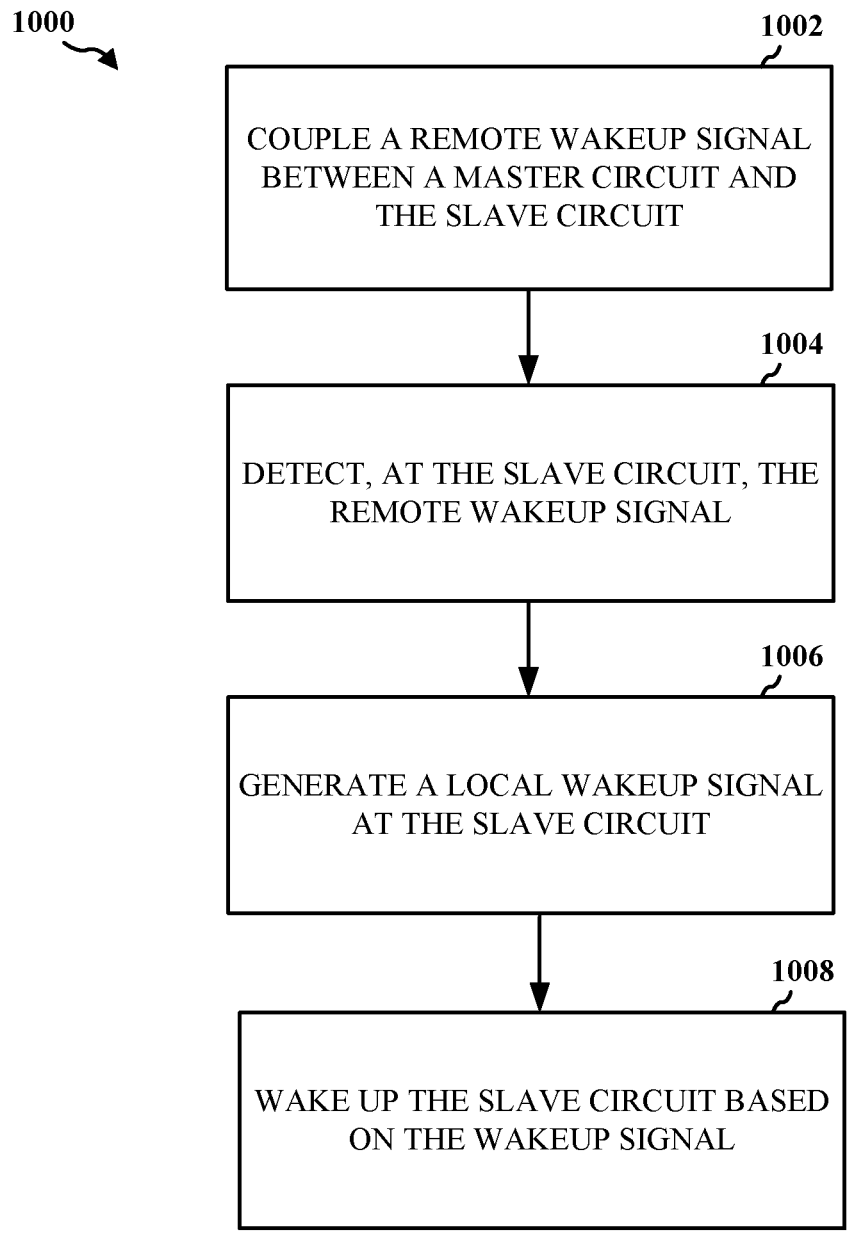
FIG. 10 is a flowchart illustrating another example method in accordance with the systems and methods described herein.

FIG. 10 is a flowchart 1000 illustrating an example method in accordance with the systems and methods described herein. The method may be implemented in a wake-up circuitry (300, 400, 500, 600) to wake up a powered down circuit (104). Block 1002 couples a remote wake-up signal (328) between a master circuit (102) and the slave circuit (104) using at least one connection of the fixed set of cable connections (106). The at least one connection (106) further couples a second signal between the master circuit (102) and the slave circuit (104). The second signal may be coupled between the master circuit (102) and the slave circuit (104) for at least a period of time when the slave circuit (104) is awake.

Block 1004 detects, at the slave circuit (104), the remote wake-up signal (328) coupled between the master circuit (102) and the slave circuit (104). In some examples, detecting the remote wake-up signal (328) may include detecting energy from the remote wake-up signal using an energy detector (402). The remote wake-up signal may be a DC voltage ($V_{DD}$). Accordingly, in one example, detecting the remote wake-up signal may include detecting the DC voltage ($V_{DD}$). In another example, the remote wake-up signal may be a control signal (306). In another example, the remote wake-up signal may be an IF signal (304). In another example, the remote wake-up signal may be an LO signal (302). The remote wake-up signal may selectively be one of a control signal (306), an IF signal (304), or an LO signal (302). In one example, detecting the remote signal may include selecting (308) one of the control signal (306), the IF signal (304), or the LO signal (302) as the remote wake-up signal (328). Some examples may filter (324, 504) the remote wake-up signal.

Block 1006 generates a local wake-up signal (346, 412) at the slave circuit (104) based on detecting the remote wake-up signal (328) coupled between the master circuit (102) and the slave circuit (104). The remote wake-up signal (328) may be generated by circuitry described with respect to FIGS. 3-6 and FIG. 8.

Block 1008 wakes up the slave circuit (104) based on the local wake-up signal (346, 412). A wake-up signal (346, 412) generated by circuitry described with respect to FIGS. 3-6 and FIG. 8 may be used to wake up circuitry such as the radio module 104 of FIG. 1.

Figure 11:
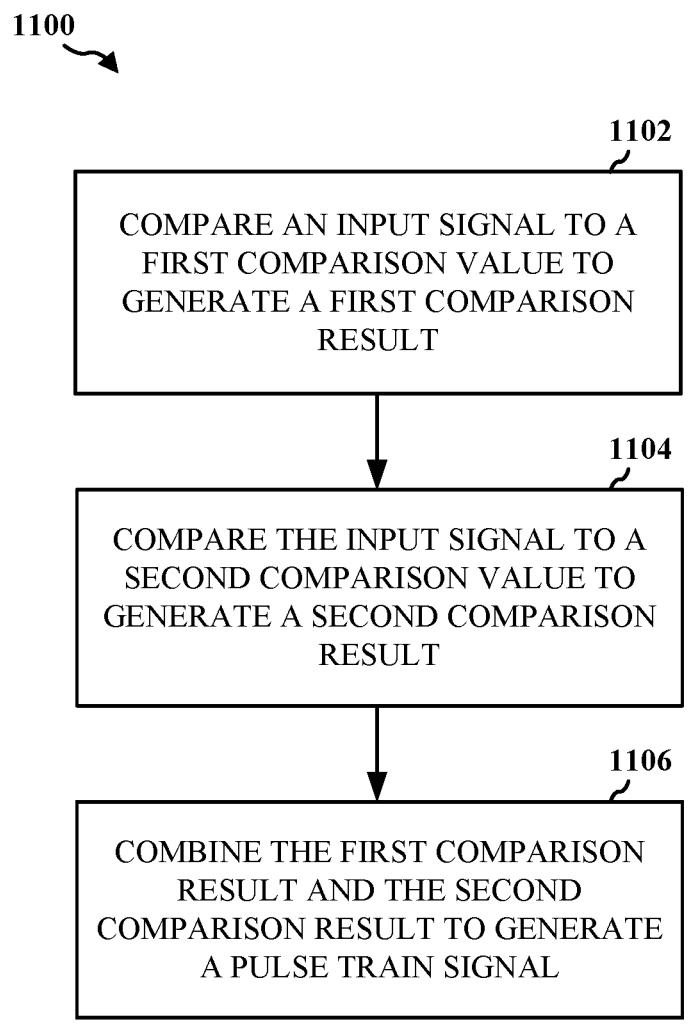
FIG. 11 is a flowchart illustrating another example method in accordance with the systems and methods described herein.

FIG. 11 is a flowchart 1100 illustrating an example method in accordance with the systems and methods described herein. The method of FIG. 11 may be used with the method of FIG. 10. The method of FIG. 11 includes a subset of the steps of the method of FIG. 9, which may be applied to the method of FIG. 10. The method may be implemented in wake-up circuitry (300) to wake up a powered down circuit (104). More particularly, the flowchart 1100 of FIG. 11 relates to detecting the remote wake-up signal (328). Block 1102 compares (312) an input signal (348) to a first comparison value (316) to generate a first comparison result (350).

Block 1104 compares (312) the input signal (348) to a second comparison (314) value to generate a second comparison result (352).

Block 1106 combines the first comparison result (350) and the second comparison result (352) to generate a signal, e.g., a pulse train signal (354).

In some examples, wake-up circuitry (300) includes a means for comparing (312) an input signal to a first comparison value (316) to generate a first comparison result (350). The example includes a means for comparing (318) the input signal to a second comparison value (318) to generate a second comparison result (352). The example includes a means for combining (320) the first comparison result (350) and the second comparison result (352) to generate a pulse train signal (354). The example includes a means for converting (336) the pulse train signal to a DC value (346). The example includes a means for waking up (346) a circuit (104) based on the DC value (346).

The example may include means for buffering (344) the DC value (346) to convert the DC value (346) to a digital voltage level (347). In some examples, the means for buffering (344) the DC value (346) may be an inverter. The example may include means for switching (322) the input signal to isolate the input signal for DC calibration. The example may include means to DC filter (324) the input signal to generate a DC filtered input signal (348). The example may include means for DC setting (326) the DC filtered input signal (348).

Some examples include means for coupling (106) a remote wake-up signal (328) between a master circuit (102) and the slave circuit (104) using at least one connection (106) of the fixed set of cable connections (106). The at least one connection (106) further couples a second signal (328) between the master circuit (102) and the slave circuit (104). The example includes means for detecting (300), at the slave circuit (104), the remote wake-up signal (328) coupled between the master circuit (102) and the slave circuit (104). The example includes means for generating (320) a local wake-up signal (346) at the slave circuit (104) based on detecting the remote wake-up signal (328) coupled between the master circuit (102) and the slave circuit (104). The example includes means for waking up (346) the slave circuit (104) based on the local wake-up signal (346).

The example may include means for comparing (312) an input signal to a first comparison value (316) to generate a first comparison result (350). The example may include means for comparing (314) the input signal to a second comparison value (318) to generate a second comparison result (352). The example may include means for combining (320) the first comparison result (350) and the second comparison result (352) to generate a signal, e.g., a pulse train signal (354).

The example may include means for selecting (308) one of the control signal (306), the IF signal (304), or the LO signal (302) as the remote wake-up signal. Additionally, the example may include means for filtering (324, 504) the remote wake-up signal (328).

The systems and methods described herein may allow for the same cable connection, e.g., DC, control, LO, or IF, to be used for a wakeup signal and for a DC, control, LO, or IF connection, respectively. Furthermore, in some examples, the systems and methods described herein may allow for the same signals, e.g., DC, control, LO, or IF, to be used as a wakeup signal and for a DC signal, control signal, LO signal, or IF signal, respectively.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus to wake up a slave circuit in a system, the apparatus comprising:
    a coupler configured to couple a remote wake-up signal between a master circuit and the slave circuit using at least one connection of a fixed set of cable connections, the at least one connection further coupling a second signal between the master circuit and the slave circuit;
    a selection component configured to select, at the slave circuit, the remote wake-up signal from a control signal, an intermediate frequency (IF) signal, or a local oscillator (LO) signal;
    a detector configured to detect, at the slave circuit, the remote wake-up signal coupled between the master circuit and the slave circuit, wherein the detector is further configured to:
        compare an input signal to a first comparison value to generate a first comparison result;
        compare the input signal to a second comparison value to generate a second comparison result; and
        combine the first comparison result and the second comparison result to generate a signal; and
    a wake-up signal generator configured to generate a local wake-up signal at the slave circuit based on detecting the remote wake-up signal coupled between the master circuit and the slave circuit and wake up the slave circuit with the local wake-up signal.

2. The apparatus of claim 1, wherein the second signal is coupled between the master circuit and the slave circuit for at least a period of time when the slave circuit is awake.

3. The apparatus of claim 1, wherein the detector comprises an energy detector.

4. The apparatus of claim 1, wherein the remote wake-up signal comprises a direct current (DC) voltage.

5. The apparatus of claim 4, wherein the detector is further configured to detect a direct current (DC) voltage.

6. The apparatus of claim 1, wherein the remote wake-up signal comprises the control signal.

7. The apparatus of claim 1, wherein the remote wake-up signal comprises the IF signal.

8. The apparatus of claim 1, wherein the remote wake-up signal comprises the LO signal.

9. The apparatus of claim 1, wherein the control signal comprises a digital bit sequence.

10. The apparatus of claim 9, further comprising a filter configured to filter the remote wake-up signal.

11. A method to wake up a slave circuit in a system, the method comprising:
    coupling a remote wake-up signal between a master circuit and the slave circuit using at least one connection of a fixed set of cable connections, the at least one connection further coupling a second signal between the master circuit and the slave circuit;
    selecting, at the slave circuit, the remote wake-up signal from a control signal, an intermediate frequency (IF) signal, or a local oscillator (LO) signal;
    detecting, at the slave circuit, the remote wake-up signal coupled between the master circuit and the slave circuit, wherein the detecting comprises:
        comparing an input signal to a first comparison value to generate a first comparison result;
        comparing the input signal to a second comparison value to generate a second comparison result; and
        combining the first comparison result and the second comparison result to generate a signal; and
    generating a local wake-up signal at the slave circuit based on detecting the remote wake-up signal coupled between the master circuit and the slave circuit and wake up the slave circuit with the local wake-up signal.

12. The method of claim 11, wherein the second signal is coupled between the master circuit and the slave circuit for at least a period of time when the slave circuit is awake.

13. The method of claim 11, wherein detecting, at the slave circuit, the remote wake-up signal comprises detecting energy using an energy detector.

14. The method of claim 11, wherein the remote wake-up signal comprises a direct current (DC) voltage.

15. The method of claim 14, further comprising detecting a direct current (DC) voltage.

16. The method of claim 11, wherein the remote wake-up signal comprises the control signal.

17. The method of claim 11, wherein the remote wake-up signal comprises the IF signal.

18. The method of claim 11, wherein the remote wake-up signal comprises the LO signal.

19. The method of claim 11, wherein the control signal comprises a digital bit sequence.

20. The method of claim 19, further comprising filtering the remote wake-up signal.

21. An apparatus to wake up a slave circuit in a system, the apparatus comprising:
   means for coupling a remote wake-up signal between a master circuit and the slave circuit using at least one connection of a fixed set of cable connections, the at least one connection further coupling a second signal between the master circuit and the slave circuit;
   means for selecting, at the slave circuit, the remote wake-up signal from a control signal, an intermediate frequency (IF) signal, or a local oscillator (LO) signal;
   means for detecting, at the slave circuit, the remote wake-up signal coupled between the master circuit and the slave circuit, wherein the means for detecting is configured to:
      compare an input signal to a first comparison value to generate a first comparison result;
      compare the input signal to a second comparison value to generate a second comparison result; and
      combine the first comparison result and the second comparison result to generate a signal; and
   means for generating a local wake-up signal at the slave circuit based on detecting the remote wake-up signal coupled between the master circuit and the slave circuit and wake up the slave circuit with the local wake-up signal.

22. The apparatus of claim 21, wherein the second signal is coupled between the master circuit and the slave circuit for at least a period of time when the slave circuit is awake.

23. The apparatus of claim 21, wherein detecting, at the slave circuit, the remote wake-up signal comprises detecting energy using an energy detector.

24. The apparatus of claim 21, wherein the remote wake-up signal comprises a direct current (DC) voltage.

* * * * *